R. M. MOWRY.
WIRE TIER.
APPLICATION FILED MAY 19, 1915.
1,180,935.
Patented Apr. 25, 1916.
3 SHEETS—SHEET 1.
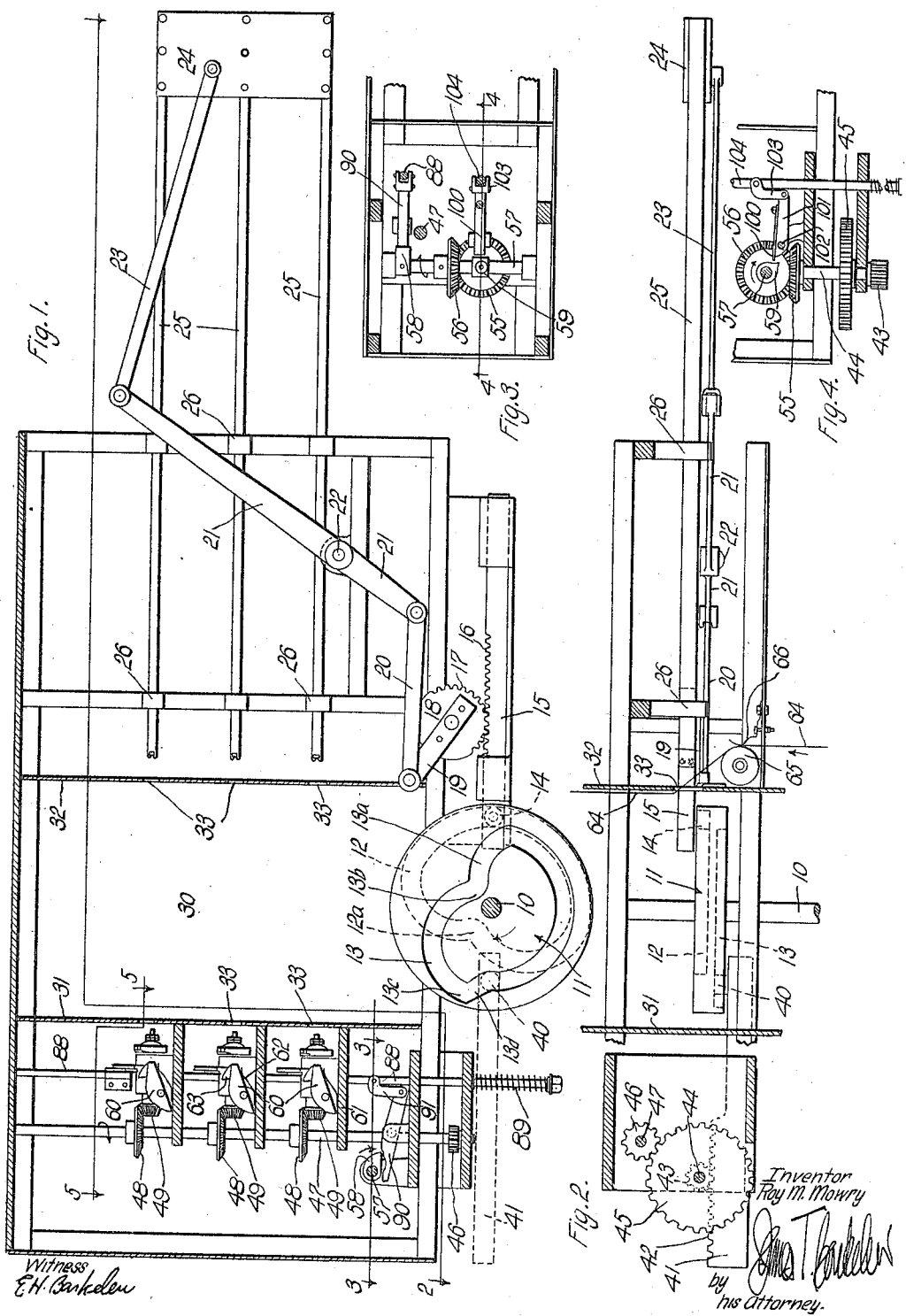
Inventor
Roy M. Mowry
by
his Attorney.

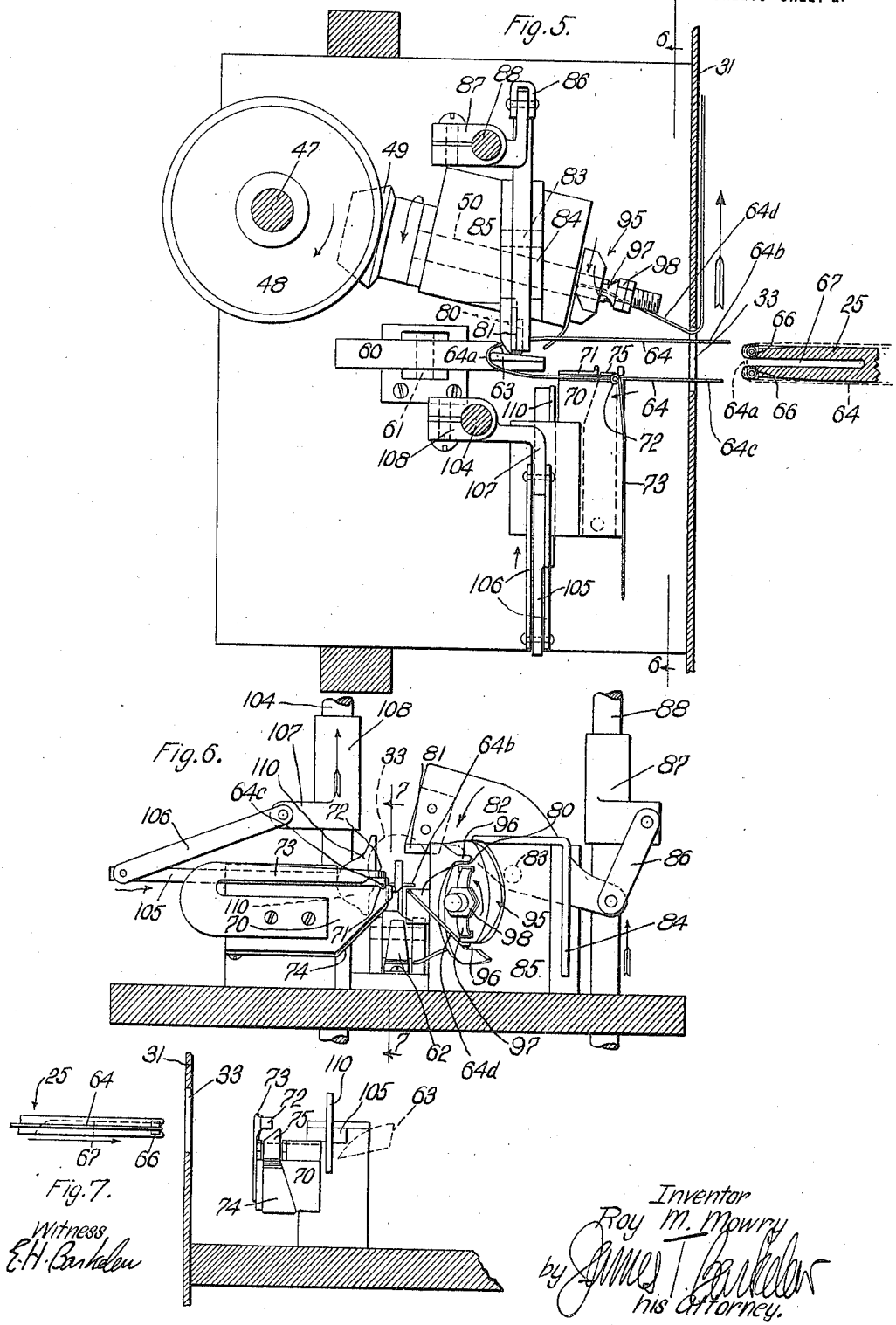

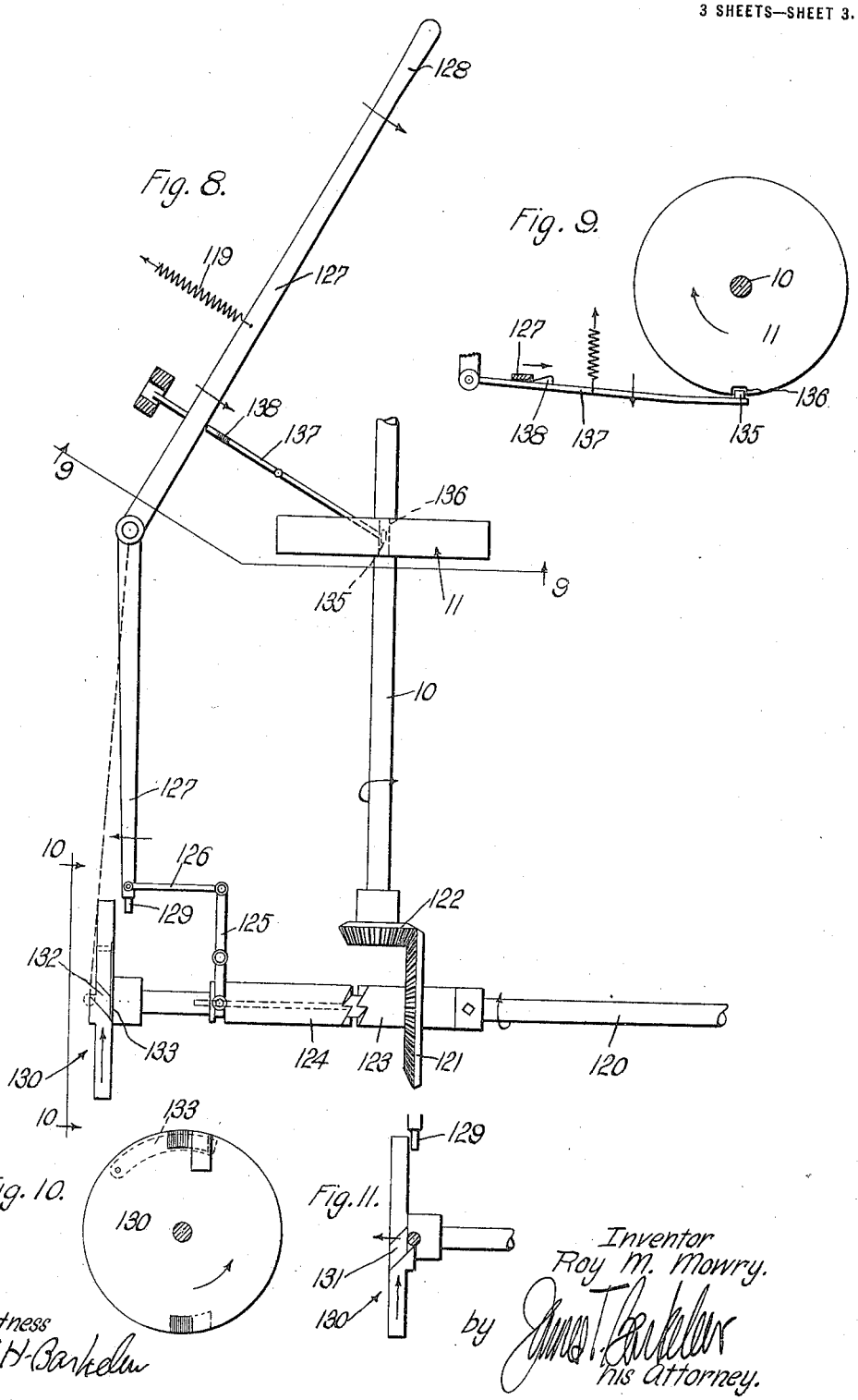

UNITED STATES PATENT OFFICE.

ROY M. MOWRY, OF LONG BEACH, CALIFORNIA.

WIRE-TIER.

1,180,935.     Specification of Letters Patent.     Patented Apr. 25, 1916.

Application filed May 19, 1915. Serial No. 29,075.

*To all whom it may concern:*

Be it known that I, ROY M. MOWRY, a citizen of the United States, residing at Long Beach, in the county of Los Angeles, State of California, have invented new and useful Improvements in Wire-Tiers, of which the following is a specification.

This invention relates to wire tiers and, preferably, particularly, to wire tiers adapted for use in connection with baling machines and the like; and it is a primary object of the invention to provide a wire tying mechanism of great simplicity and efficiency.

There are many novel features contained in my invention as hereinafter specified.

Reference is made to the accompanying drawings in which I have illustrated a preferred form of my mechanism, and in which drawings, Figure 1 is a vertical longitudinal central section of my tying apparatus, Fig. 2 is a horizontal section taken as indicated by line 2—2 on Fig. 1, Fig. 3 is a detail horizontal section taken as indicated by line 3—3 on Fig. 1, Fig. 4 is a detail vertical section taken as indicated by line 4—4 on Fig. 3, Fig. 5 is an enlarged horizontal detail section taken as indicated by line 5—5 on Fig. 1, Fig. 6 is a vertical detail section taken as indicated by line 6—6 on Fig. 5, Fig. 7 is a detail vertical section taken as indicated by line 7—7 on Fig. 6, Fig. 8 is a plan diagram showing the mechanism for operating the tying mechanism, Figs. 9 and 10 are detail views taken as indicated by lines 9—9 and 10—10 on Fig. 8, and Fig. 11 is a view showing another position of parts shown in Fig. 8.

In the form in which my tier is adapted to a baling machine or the like, the complete tier consists primarily of the tying mechanism proper and the means for moving the wires across the end of a compressed bale into the tying mechanism. In Figs. 1 and 2 I have shown the apparatus with the wire carrying devices at the right hand side and the tying mechanism proper at the left hand side. The entire piece of machinery is operated through the medium of a single shaft 10 which is intermittently operated by any preferred mechanism, automatically controlled or controlled by hand, the shaft being rotated one revolution upon each successive operation.

My preferred means for intermittently rotating the shaft 10 is shown in Figs. 8 to 11. There is a constantly driven shaft 120 having a loose gear 121 meshing with a gear 122 on shaft 10, these gears being preferably in the ratio two to one. Gear 121 carries a clutch member 123 adapted to be engaged by clutch member 124 splined to shaft 120. Member 124 is moved longitudinally through the medium of a pivoted lever 125 connected by rod 126 with lever 127, said lever having a handle 128 on one end and having a cam following roller 129 on the other end. A spring 119 holds the lever normally in position against movement as indicated by the arrows. The handle 128 is put in any position convenient to the operator; as, in a baling machine, at a position near the delivery end of the machine so that the man watching the discharge of bales may regulate the frequency with which the tying mechanism is operated. The roller 129 coöperates with a cam 130 which has two peripheral diagonally placed notches 131 and 132 passing through the cam in opposite directions as is clearly seen from Figs. 8, 10 and 11. The parts are normally in the position of Fig. 8. When the operator wishes to start the tying operation he moves handle 128 as indicated, throwing the follower 129 against one face of the cam and holds it there until the follower passes through the notch 131 to the opposite face of the cam. The follower is shown about to do this in Fig. 11. Having passed to the other face of the cam the follower presses against that face until the cam turns a half revolution and the notch 132 comes opposite the follower, when the action of spring 119 causes the follower to pass through this notch to the opposite face, the follower and the lever 127 being thus returned to normal position after one half revolution of the cam. The notch 132 is protected on the first mentioned face of the cam by a spring tongue 133 so that the follower 129 cannot pass from its normal position to the opposite face of the cam except through notch 131. Thus it will be seen that, whatever the position of cam 130 may be when the operator moves handle 128, the lever 127 will not be moved by the cam action until the proper place on the cam is reached, and that after the action is thus started by manual control the cam action is definite and automatic. The operation is such that, although the operator can manually control the frequency of this action, once he starts the action it is thenceforth entirely automatic. The action of the cam is to throw the clutch 123, 124 into engagement during one half revolution of shaft 120 and to thereby cause, through gears 121 and 122, the accurate rotation of shaft 10 one whole revolution. To keep the shaft 10 and the clutch member 123 normally in correct position of rest, so that clutch member 124 will always properly engage, I provide a stop 135 engaging a notch 136 in cam 11. Stop 135 is mounted on pivoted arm 137 having a wedge 138 over which the lever 127 is adapted to ride when moved as indicated; the action being to throw the stop 135 down out of the notch 136 at the same time that the clutch is engaged and to allow the stop to reënter the notch when the cam has made one revolution and the clutch is disengaged.

The shaft 10 carries the cam 11 having two cam grooves 12 and 13 upon its opposite faces. A roller 14 engages the cam groove 12, this roller being mounted upon a horizontal slider 15 having rack teeth 16 meshing with the teeth 17 of a gear 18, the gear carrying an arm 19. Arm 19 is connected by the rod 20 with a lever 21 pivoted at 22 on the suitable frame of the machine, the other end of the lever being connected by rod 23 with the end frame 24 of the horizontal reciprocating needles 25. These needles may be of any number, being suitably three in number for placing three wires around a bale, the tying mechanism proper being then of the same number.

The needles 25 are mounted in suitable bearings 26 so as to be horizontally slidable. The cam groove 12 is of such shape that when the cam 11 is rotated one revolution in the direction indicated in Fig. 1, the needles 25 will be thrown across the bale space 30, between the two side plates 31 and 32, through apertures 33 in those plates, and the ends of those needles will enter into the tying mechanism proper on the opposite side of the machine, to coöperate with that mechanism as hereinafter described. The cam groove 12 is so shaped that the needles move across the space quickly and have a sharp quick return so that the needles are projected into the tying mechanism proper for a minimum period. It will be noted that the shape of the cam groove 12 is such, that after the needles have been returned to their normal position as shown in Fig. 1, there may be a considerable revolution of the cam without any movement on the part of the needles. It is during this part of the revolution of the cam that the latter part of the operation of the tying mechanism proper takes place; the operation of the tying mechanism proper commencing immediately after the needles are withdrawn and are on their movement toward their normal positions.

The cam groove 13 is engaged by a roller 40 mounted upon a slider 41, which slider has teeth 42 engaging with teeth 43 of a small pinion mounted upon the shaft 44. Shaft 44 carries a large gear 45 which meshes with a pinion 46 on a vertical shaft 47. This shaft 47 carries bevel gears 48 which mesh with the bevel gears 49 which in turn drive the twister shafts 50. The vertical shaft 44 also carries on its upper end a bevel gear 55 meshing with another bevel gear 56 on a horizontal cam shaft 57, said shaft carrying cams 58 and 59 whose functions are hereinafter explained.

It will be noted that the shape of the cam groove 13 is peculiar; that upon rotation in the direction indicated, the roller 40 will not be moved by operation of the cam groove until the cam has rotated nearly a half revolution. The portion 13$^a$ of the cam groove 13 does not coöperate with the roller 40 until after the point 12$^a$ in the cam groove 12 has passed the roller 14; that is, the roller 40 does not begin to move to the right in Fig. 1 until after the roller 14 have moved to its farthest position to the left in Fig. 1 and has begun to move again to the right. The roller 40 is then moved toward the right until the portion 13$^b$ of the cam groove reaches it, and then moves to the left toward and past its original position until the portion 13$^c$ of the cam groove reaches it and then, by operation of the short portion 13$^d$ of the cam groove, moves back to its original position. The result of this action of the cam groove on roller 40 is designed so as to produce the following described movements of each of the twister shafts 50: first, a movement in the direction indicated in Fig. 5, through five (or any other suitable number) whole revolutions, and then a movement in a reverse direction for five and one half revolutions and lastly a movement in the direction indicated for one-half a revolution. During the first five revolutions two wires are twisted together; during the succeeding five and one half revolutions the twister disengages itself from the wires which have been twisted, and during the final one half revolution the twister picks up the end of one of the wires next to be twisted. All of these features will be hereinafter explained.

In each one of the tying mechanisms there is a member 60 mounted upon a pivot 61 and held normally in position by a spring 62, this member carrying a horn 63 on its forward end, over which horn the wire 64 is looped by the action of the needle 25. The wire 64 is fed into the machine from any suitable spool or other source, fed over a roller 65, against which there is pressing an adjustable spring 66 to put tension upon the wire 64; and the wire 64 extends through the aperture 33 and thence around the bale which has previously been formed in space 30. The wire 64 extends across and through the opening 33 as is best shown in Fig. 2; and upon its forward movement the needle 25 engages the wire 64 across and around its end as is clearly shown in Figs. 5 and 7. The needle travels across the space 30 and carries a loop of the wire across that space with it. The end of the needle is preferably provided with a pair of rollers 66 one at each front corner to form antifriction bearings for the wire. Between these rollers, the needle has on its underside a longitudinal slot 67, which slot passes over the horn 63, and allows the horn to move upwardly in back of the part $64^a$ of the wire. As the needle moves toward the horn, the part $64^a$ of the wire engages the horn and pushes it downwardly, the horn immediately rising behind the wire and, when the needle 25 is withdrawn, the wire is left in the position shown in Figs. 5 and 6, looped around the horn. The part $64^b$ of the wire is the one which has just been pushed by the needle across the rear end of the bale just formed, while the part $64^c$ of the wire has just been drawn from the supply spool. In order to hold the part $64^c$ of the wire well away from the part $64^b$, for reasons which will hereinafter become apparent, I provide a block 70 having a groove 71 in its face. The curled end 72 of a spring 73 normally stands over this groove 71, preventing the wire from moving upwardly and thus moving out of the groove. To prevent the wire moving horizontally out of the groove I provide a spring 74 having an end 75 which projects upwardly just outside the groove. This spring 74 is shaped in the peculiar manner shown in Figs. 5, 6 and 7, having a beveled upper end as is clearly shown in Fig. 7. When the needle 25 moves into the tying mechanism, it engages the end 72 of the spring 73 and also engages the end 75 of the spring 74. It pushes the end of the spring 73 back in the direction indicated by the arrow in Fig. 5 and it pushes the spring 74 directly downwardly. The wire having been deposited in place as shown in Fig. 5, and the needle 25 having been withdrawn, the springs resume their normal positions and the wire is prevented from moving from the position shown in Fig. 5 when the loop of wire is cut on the opposite side of the horn 63. The spring 74 also has another movement, outwardly or to the right in Fig. 6, which movement takes place when the portion $64^c$ of the wire is pushed to the right in Fig. 6 by positive operation of the mechanism as will be hereinafter explained.

The wire having been placed in position, the next operation is that of cutting it on the right hand side of the horn in Fig. 6; that is, cutting the portion $64^b$. A stationary cutting member 80 is provided, with which the movable cutting member 81 coöperates. The cutter 81 is mounted upon the arm 82 pivoted at 83 to a cutter carrier 84 which is mounted in the block 85 which also carries twister shaft 50. The outer end of this cutter arm 82 is connected by toggle 86 with a collar 87 adjustable upon the vertically moving rod 88. The rod is moved downwardly by the spring 89 and is moved upward by the action of cam 58 on the shaft 57. The first movement of the shaft 57 is in the direction indicated causing the cam 58 to press downwardly upon the pivoted arm 90 which is connected by toggle 91 with the rod 88, causing the rod 88 to be moved upwardly and thus causing movement of cutter arm 82 in the direction indicated. When the wire 64 is deposited in the position shown in Fig. 5, its part $64^b$ is deposited over the stationary cutter member 80, and movement of the cutter member 81 downwardly will sever the wire at that point. The cam 58 is so placed upon the shaft 57 and all the other connections with the cutter are so arranged, that the wire $64^b$ is cut during the first part of the movement of the tying mechanism, and before the twister shaft 50 has advanced more than a quarter of a revolution.

The twister shaft 50 carries upon its end a twister head 95 which is clearly shown in Figs. 5 and 6. This twister head has two oppositely disposed hooks 96, adapted to engage the wire 64 in its portion $64^b$. The twister head 95 is mounted upon the twister shaft in such manner as to be slidable thereon but rotatable therewith and it is pressed toward the block 85 by a suitable spring 97 held beneath nut 98 in the manner shown. It will be noted that the parts are in such arrangement that, when the twister head rotates in the direction indicated in Figs. 5 and 6, the uppermost hook 96 will immediately hook over the wire portion $64^b$; and this operation takes place immediately and very quickly after this portion of the wire has been severed and before this portion of the wire has time to move away from its position as shown in Figs. 5 and 6. As hereinbefore stated, the twister shaft and the twister head 95 with it, revolves in the direction indicated for five revolutions. The wire portion $64^b$ is caught in the hook 96 and the trailing end of this wire (the end formed by the cut just explained) is drawn in between the twister head 95 and block 85, so that a sharp angle is formed in the wire to prevent its pulling away from the twister head. At the same time the wire 64$^d$ is being similarly held by the other hook of the twister head, and the two wires are thus necessarily twisted together during the five whole revolutions of the twister head in the direction indicated. Immediately after these five revolutions in the direction indicated, the twister head is moved five and one half revolutions in the opposite direction, with the result that the twister head immediately frees itself from the ends of the two wires, and the ends of these two wires are immediately pulled through the opening 33 by the tension of the compressed bale around which the wires are tightly placed. Up to this point in the operation of the device, the portion 64$^c$ of the wire is still left in the position shown in Figs. 5 and 6. It still stands in this position while the twister head is rotating reversely through its five and one half revolutions; but during the ensuing one half revolution forwardly the wire 64$^c$ is positively moved from its position into such a position that it will be caught by one of the hooks 96 of the twister head 95 during this described one half forward revolution of the head. The mechanism for accomplishing this transposition of the wire portion 64$^c$ is operated from the cam 59 on shaft 57. This cam is shown in Figs. 3 and 4. The cam engages a spring tongue 100 mounted upon a lever arm 101 pivoted at 102, the lever arm 101 being connected by toggle 103 with the vertical rod 104. The cam 59 is so placed that, during the last one half revolution of the twister shaft, the corresponding revolution of the shaft 57 in the direction indicated will cause the point of the cam to press downwardly on the tongue 100 and thus cause the rod 104 to be moved quickly and momentarily upwardly. It will be noted that the position of the spring tongue 100 makes the cam inoperative upon the arm 101 when the cam passes the end of the spring tongue in the direction opposite to that indicated which it does during a part of the operation. Thus, the vertical rod 104 is given only one movement during each complete operation of the tying mechanism, that movement being a quick up and down movement during the period in which the twister head is taking its last one half revolution.

In each of the tying mechanism the vertical rod 104 is connected with a horizontal slider 105, this connection being made through the medium of toggle 106 which connects to an ear 107 of an adjustable collar 108 mounted upon the rod 104. Upward movement of the rod will cause movement of the slider 105 in the direction indicated. This slider carries upon its end a pusher 110 of the configuration shown in the various views; and this pusher is seen to be immediately opposite the wire portion 64$^b$. The motion of this pusher in the direction indicated will push the wire portion 64$^b$ across toward the position previously occupied by the wire portion 64$^b$; to such a position where it will be engaged with a hook of the twister head 95 upon its last one half revolution in the direction indicated. The spring 74 is of such strength that it readily yields to this positive forced movement of the wire 64$^c$ from one position to the other. The operation of transposing this wire is timed so that, immediately its hooked or bent end 64$^a$ is pulled off the horn 63, then the hook of the twister head 95 catches the wire before it can fall from this position, and the end of the wire is immediately carried downwardly to the position shown at 64 in Figs. 5 and 6, the extreme end of the wire being wedged in between twister head and the block 85 in the manner clearly shown in Figs. 5 and 6. In this position the wire is ready for the next ensuing twisting or tying operation of the tying mechanism which begins, when the hand lever 128 is moved by the operator, with the carrying into the tying mechanism by the needle 25 of another loop of wire; the complete operation being then repeated in the same manner as hereinbefore described.

From the foregoing it will be seen that the operation of my tying mechanism includes essentially the following steps: the deposition of a loop of wire upon some stationary part which will hold the loop, the twisting of the cut portion of the wire into a tie with the end of a previously deposited wire, and the movement of the wire of the other side of the loop to a position ready to be twisted into a tie together with the first mentioned side of the succeeding loop of wire. The mechanism herein explained is my now preferred form for carrying on this operation.

Having described a preferred form of my invention, I claim:

1. A wire tying mechanism, comprising a member for holding a loop of wire, means for cutting the wire on one side of the loop, a revolving twister head having means for simultaneously engaging and holding two wires, said head being situated relatively to the wire on one side of the loop as to engage that wire upon rotation, and means for moving the other side of said loop of wire into engagement with the twister head.

2. A wire tying mechanism comprising a member for holding a loop of wire, means for cutting the wire on one side of its said loop, a revolving twister head having means for simultaneously engaging and holding two wires, said head being situated relatively to said loop holding member and the loop held thereby so as to engage the cut side of said wire loop upon rotation in one direction, means to first rotate said head in said direction and then in the opposite direction and then in said direction again, and means for moving the other side of said wire loop into engagement with said head during its last mentioned rotation.

3. A wire tying mechanism, comprising a member for holding a loop of wire, means for cutting the wire on one side of its loop leaving the other side hooked around said member, means for engaging the cut side of said wire and for twisting it with another wire, said means embodying a twister head having means for simultaneously holding two wires, and means for subsequently moving the other side of said wire loop into engagement with said twister head.

4. A wire tying mechanism, comprising a member for holding a loop of wire, means for cutting the wire on one side of its loop leaving the other side hooked around said member, means for engaging the cut side of said wire and for twisting it with another wire, said means embodying a twister head having a pair of oppositely disposed hooks for simultaneously holding two wires, and means for subsequently moving the other side of said wire loop into engagement with said twister head.

5. A wire tying mechanism, comprising a member for holding a loop of wire, means for cutting the wire on one side of its loop leaving the other side hooked around said member, means for engaging the cut side of said wire and for twisting it with another wire, said means embodying a twister head having a pair of oppositely disposed hooks for simultaneously holding two wires, means for revolving said head in one direction to twist the two wires together and for revolving said head in a reverse direction to disengage its said hooks from the twisted wires, and means for subsequently moving the other side of said wire loop into engagement with said twister head.

6. In a tying mechanism, a twister head having means for simultaneously engaging and holding a pair of wires to be twisted together, and means for first rotating the twister head in one direction to twist the two wires together and then in the opposite direction to release the twisted wires from the head, and then in the first direction again, and means to move another wire into engagement with the head during its said last mentioned movement.

7. In a tying mechanism, a twister head having means for simultaneously engaging and holding a pair of wires to be twisted together, and means for first rotating the twister head in one direction to twist the two wires together and then in the opposite direction to release the twisted wires from the head.

8. A wire tying mechanism, comprising a member for holding a loop of wire, means for cutting the wire on one side of the loop, a revolving twister head having means for simultaneously engaging and holding two wires, said head being situated relatively to the wire on one side of the loop as to engage that wire upon rotation, means for revolving the twister head embodying a cam, a slider with a cam follower and with rack teeth, a gear meshing with said rack teeth and rotatively connected with the twister head, and means for intermittently rotating said cam, and means for moving the other side of the loop of wire into engagement with the twister head.

9. A wire tying mechanism, comprising a member for holding a loop of wire, means for cutting the wire on one side of the loop, a revolving twister head having means for simultaneously engaging and holding two wires, said head being situated relatively to the wire on one side of the loop as to engage that wire upon rotation, means for revolving the twister head embodying a cam, a slider with a cam follower and with rack teeth, a gear meshing with said rack teeth and rotatively connected with the twister head, and means under manual control for intermittently rotating said cam, and means for moving the other side of the loop of wire into engagement with the twister head.

10. A wire tying mechanism, comprising a member for holding a loop of wire, means for cutting the wire on one side of its loop leaving the other side hooked around said member, means for engaging the cut side of said wire and for twisting it with another wire, said means embodying a twister head having means for simultaneously holding two wires, means for subsequently moving the other side of said wire loop into engagement with said twister head, means embodying a needle for moving a loop of wire onto said loop holding member, and operating mechanism for the twister head and the loop moving needle embodying a cam having a pair of cam grooves, a slider with rack teeth and a follower engaging one of said cam grooves, a gear engaging said rack teeth, an arm on said gear and connection between said arm and the loop moving needle, another slider with rack teeth and a follower engaging the other cam groove, a gear engaging said rack teeth and rotatively connected with the twister head, and means for intermittently rotating said cam.

11. A wire tying mechanism, comprising a member for holding a loop of wire, means for cutting the wire on one side of its loop leaving the other side hooked around said member, means for engaging the cut side of said wire and for twisting it with another wire, said means embodying a twister head having means for simultaneously holding two wires, and means for subsequently moving the other side of said wire loop into engagement with said twister head, means embodying a needle for moving a loop of wire onto said loop holding member, and operating mechanism for the twister head and the loop moving needle embodying a cam having a pair of cam grooves, a slider with rack teeth and a follower engaging one of said cam grooves, a gear engaging said rack teeth, an arm on said gear and connection between said arm and the loop moving needle, another slider with rack teeth and a follower engaging the other cam groove, a gear engaging said rack teeth and rotatively connected with the twister head, and means under manual control for intermittently rotating said cam.

12. A wire tying mechanism, comprising a member for holding a loop of wire, means for cutting the wire on one side of the loop, a revolving twister head having means for simultaneously engaging and holding two wires, said head being situated relatively to the wire on one side of the loop as to engage that wire upon rotation, means for revolving the twister head embodying a cam, a slider with a cam follower and with rack teeth, a gear meshing with said rack teeth and rotatively connected with the twister head, and means for intermittently rotating said cam, and means for moving the other side of the loop of wire into engagement with the twister head, said means embodying a constantly rotating shaft, clutch connection between said shaft and said cam, and cam means on the constantly rotating shaft to throw said clutch connection.

13. A wire tying mechanism, comprising a member for holding a loop of wire, means for cutting the wire on one side of the loop leaving the other side hooked around said member, means for engaging the cut side of said wire and for twisting it with another wire, said means embodying a twister head having means for simultaneously holding two wires, means for subsequently moving the other side of said wire loop into engagement with said twister head, means embodying a needle for moving a loop of wire onto said loop holding member, and operating mechanism for the twister head and the loop moving needle embodying a cam having a pair of cam grooves, a slider with rack teeth and a follower engaging one of said cam grooves, a gear engaging said rack teeth, an arm on said gear and connection between said arm and the loop moving needle, another slider with rack teeth and a follower engaging the other cam groove, a gear engaging said rack teeth and rotatably connected with the twister head, and means for intermittently rotating said cam, said means embodying a constantly rotating shaft, clutch connection between said shaft and said cam, and cam means on the constantly rotating shaft to throw said clutch connection.

14. A wire tying mechanism, comprising a member for holding a loop of wire, means for cutting the wire on one side of its loop, a revolving twister head having means for simultaneously engaging and holding two wires, said head being situated relatively to the wire on one side of the loop as to engage that wire upon rotation, means for revolving the twister head embodying a cam, a slider with a cam follower and with rack teeth, a gear meshing with said rack teeth and rotatively connected with the twister head, and means for intermittently rotating said cam, and means for moving the other side of the loop of wire into engagement with the twister head, said means embodying a constantly rotating shaft, clutch connection between said shaft and said cam, a double faced cam disk on the constantly rotating shaft having a pair of oppositely disposed notches through its periphery, said notches being arranged diagonally one from one face and the other from the other face of the cam, a hand lever having a follower adapted to pass through said notches, spring means to press the hand lever in one direction, and connection between the lever and said clutch.

15. A wire tying mechanism, comprising a member for holding a loop of wire, means for cutting the wire on one side of the loop leaving the other side hooked around said member, means for engaging the cut side of said wire and for twisting it with another wire, said means embodying a twister head having means for simultaneously holding two wires, means for subsequently moving the other side of said wire loop into engagement with said twister head, means embodying a needle for moving a loop of wire onto said loop holding member, and operating mechanism for the twister head and the loop moving needle embodying a cam having a pair of cam grooves, a slider with rack teeth and a follower engaging one of said cam grooves, a gear engaging said rack teeth, an arm on said gear and connecting between said arm and the loop moving needle, another slider with rack teeth and a follower engaging the other cam groove, a gear engaging said rack teeth and rotatively connected with the twister head, and means for intermittently rotating said cam, said means embodying a constantly rotating shaft, clutch connection between said shaft and said cam, a double faced cam disk on the constantly rotating shaft having a pair of oppositely disposed notches through its periphery, said notches being arranged diagonally leading one from one face and the other from the other face of the cam, a hand lever having a follower adapted to pass through said notches, spring means to press the hand lever in one direction, and connection between the lever and said clutch.

16. A wire tying mechanism, comprising means for holding a loop of wire, means for severing the wire loop, a tying mechanism having means for simultaneously holding two wires and being situated relatively to the wire on one side of the loop so as to engage that wire; and means to cause the wire of the other side of the loop to be engaged by said tying mechanism.

17. A wire tying mechanism, comprising means for holding a loop of wire, means for severing the wire loop, a rotatable twister mechanism having means for simultaneously holding two wires and adapted upon rotation to engage and hold the wire of one side of the loop, means to first revolve the twister mechanism in one direction to engage said wire and then in the opposite direction and lastly in the first mentioned direction, and means to cause the wire of the other side of the loop to be engaged by the twister mechanism during its last mentioned rotation.

18. A wire tying mechanism, comprising means for holding a loop of wire, means for severing the loop, means for engaging one side of the loop and for tying it with another wire, and means for subsequently causing the other side of the loop to be engaged by the tying means.

19. A wire tying mechanism, comprising means for forming and holding a loop of wire, said means embodying a longitudinally slotted needle adapted to carry the wire in a loop over its end and a horn adapted to enter in the needle slot and engage behind the wire loop so that when the needle recedes the wire loop is left looped around the horn, means for severing the wire at one side of the loop leaving the other part of the wire hooked around the horn, means for engaging the cut side of the wire and tying it with another wire, and means for subsequently moving the other side of the wire loop into engagement with the tying means.

20. A wire tying mechanism, comprising means for forming and holding a loop of wire, said means embodying a longitudinally slotted needle adapted to carry the wire in a loop over its end and a horn adapted to enter in the needle slot and engage behind the wire loop so that when the needle recedes the wire loop is left looped around the horn, means for severing the wire at one side of the loop leaving the other part of the wire hooked around the horn, means for engaging the cut side of the wire and tying it with another wire, means for holding the other side of the wire loop against lateral movement toward the position formerly occupied by the cut side of the loop, and means for subsequently moving the other side of the wire loop into engagement with the tying means.

21. A wire tying mechanism, comprising means for forming and holding a loop of wire, said means embodying a longitudinally slotted needle adapted to carry the wire in a loop over its end and a horn adapted to enter in the needle slot and engage behind the wire loop so that when the needle recedes the wire loop is left looped around the horn, means for severing the wire at one side of the loop leaving the other part of the wire hooked around the horn, means for engaging the cut side of the wire and tying it with another wire, yielding means for holding the other side of the wire loop against lateral movement toward the position formerly occupied by the cut side of the loop, said means embodying a spring projecting upwardly inside the said wire and yielding both to downward and lateral movement, and means for subsequently moving the other side of the wire loop into engagement with the tying means.

22. A wire tying mechanism, comprising means for holding a loop of wire, means for severing the loop, rotatable means for engaging one side of the loop and for twisting it with another wire, said means having parts for simultaneously engaging two wires, and means for subsequently causing the other side of the loop to be engaged by the rotatable twisting means.

23. A wire tying mechanism, comprising a member for holding a loop of wire, means for severing the loop, means for engaging one side of the wire loop and tying it with another wire, means for subsequently causing the other side of the wire loop to be engaged by the tying means, means embodying a needle for moving a loop of wire onto the loop holding member, and operating means for the tying means and the needle embodying a cam having a pair of cam grooves, followers for said cam grooves, operative connective means between one of said followers and the tying means and between the other of said followers and the needle, and means for rotating said cam.

24. A wire tying mechanism, comprising a member for holding a loop of wire, means for severing the loop, means for engaging one side of the wire loop and tying it with another wire, means for subsequently causing the other side of the wire loop to be engaged by the tying means, means embodying a needle for moving a loop of wire onto the loop holding member, and operating means for the tying means and the needle embodying a cam having a pair of cam grooves, followers for said cam grooves, operative connective means between one of said followers and the tying means and between the other of said followers and the needle, and means for rotating said cam, said means embodying a constantly rotating shaft, a clutch adapted to connect said cam to said shaft, and manually controlled cam means actuated from said constantly rotating shaft adapted to throw said clutch into and out of operative position.

In witness that I claim the foregoing I have hereunto subscribed my name this 11th day of May 1915.

ROY M. MOWRY.

Witnesses:
James T. Barkelew,
Elwood H. Barkelew.

Copies of this patent may be obtained for five cents each, by addressing the "Commissioner of Patents, Washington, D. C."